United States Patent
Kasuya et al.

(10) Patent No.: US 8,102,639 B2
(45) Date of Patent: Jan. 24, 2012

(54) MULTI-LAYER CERAMIC CAPACITOR AND MANUFACTURING METHOD THEREOF

(75) Inventors: Yuichi Kasuya, Gunma (JP); Youichi Mizuno, Gunma (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 671 days.

(21) Appl. No.: 12/179,422

(22) Filed: Jul. 24, 2008

(65) Prior Publication Data

US 2009/0067117 A1    Mar. 12, 2009

(30) Foreign Application Priority Data

Jul. 26, 2007    (JP) .................. 2007-194041

(51) Int. Cl.
*H01G 4/005* (2006.01)
*H01G 4/06* (2006.01)
(52) U.S. Cl. .............. 361/305; 361/311; 29/25.42
(58) Field of Classification Search .......... 361/303–305, 361/311; 29/25.42
See application file for complete search history.

(56) References Cited

U.S. PATENT DOCUMENTS

| | | | | |
|---|---|---|---|---|
| 2002/0124910 | A1* | 9/2002 | Miyazaki et al. | 148/23 |
| 2007/0253140 | A1* | 11/2007 | Randall et al. | 361/300 |
| 2008/0174931 | A1* | 7/2008 | Skamser et al. | 361/272 |
| 2008/0233422 | A1* | 9/2008 | Kodas et al. | 428/570 |

FOREIGN PATENT DOCUMENTS

| | | | |
|---|---|---|---|
| JP | 08-078267 | | 3/1996 |
| JP | 2001-122660 | | 5/2001 |
| JP | 2002343669 | A * | 11/2002 |
| JP | 2003068559 | A * | 3/2003 |
| JP | 2003077761 | A * | 3/2003 |
| JP | 2004193233 | A * | 7/2004 |
| JP | 2004-319435 | | 11/2004 |

* cited by examiner

*Primary Examiner* — Eric Thomas
(74) *Attorney, Agent, or Firm* — Law Office of Katsuhiro Arai

(57) ABSTRACT

A multi-layer ceramic capacitor, which has an internal electrode of good continuity and may be obtained at a relatively low cost, is disclosed. The internal electrode layer comprises metal particles, wherein the arithmetic mean particle diameter of the metal particles, which is determined based on the particle diameter in the direction parallel with the plane direction of the internal electrode layer, is made smaller than the thickness of the internal electrode layer. The multi-layer ceramic capacitor can be obtained by forming the internal electrode layer using a conductive paste containing a conductive power comprising Ni metal particles coated with particles of a base metal selected from Mn, Co, Fe, Cu, Nb, Ba, Ca, Sr, Ti, Zn, V, and rare earth metals, particles of an oxide thereof and applying a heat treatment in a reducing firing atmosphere having an oxygen partial pressure from about $10^{-14}$ to $10^{-18}$ atm.

10 Claims, 3 Drawing Sheets

MULTI-LAYER CERAMIC CAPACITOR AND MANUFACTURING METHOD THEREOF

BACKGROUND OF THE INVENTION

1. Field of the Invention

The present invention concerns a multi-layer ceramic capacitor and a manufacturing method thereof having a feature in an Ni internal electrode.

2. Description of the Related Technology

A multi-layer ceramic capacitor is manufactured by coating a conductive paste containing Ni metal particles by screen printing on a ceramic green sheet to form an internal electrode pattern, laminating a plurality of ceramic green sheets each formed with an internal electrode pattern and firing the obtained laminate.

The Ni conductive paste is fired simultaneously with the ceramic green sheet. Since the sintering initiation temperature for the Ni metal particles contained in the conductive paste is lower than the sintering initiation temperature for the ceramic layer formed of the ceramic green sheet, sintering of the Ni metal particles initiates first to initiate shrinkage. Subsequently, sintering of the dielectric ceramic layer initiates. In this case, the metal particles are fired further till the dielectric ceramic layer is sintered. Therefore, shrinkage proceeds further to result in a disconnected state such as a network-like or island-shape state in the internal electrode of the finished multi-layer ceramic capacitor. This decreases the area of the internal electrode to generate lowering of the electrostatic capacity.

The method of solving such disconnection of the internal electrode includes a method of adding a ceramic powder into a conductive paste to approach the temperature of firing shrinkage for the conductive paste to the temperature of firing shrinkage for the dielectric ceramic layer as disclosed in Japanese Unexamined Patent Publication Nos. Hei-8-078267 and 2001-122660. Further, a method of forming a cover layer of a noble metal having a higher melting point on the surface of an Ni metal particle of a conductive paste has been proposed as described in Japanese Unexamined Patent Publication No. 2004-319435.

However, the method of adding the ceramic powder in the conductive paste involves the following problem. As a result of grain growth of the metal particles in the course of firing, the ceramic powder and the metal particles are separated to discharge the ceramic powder into the dielectric ceramic layer. Generally, since the ceramic powder has poor wettability with the metal particles as the main ingredient of the conductive paste, the ceramic powder present between the metal particles is extruded by the metal particles during firing. The ceramic powders discharged in the course of the firing gather to form a columnar or network-shape to connect adjacent two dielectric ceramic layers. Further, since the grain growth of the metal particle is suppressed by the dielectric ceramic layers in the direction of the thickness, it proceeds so as to extend in the direction parallel with the plane direction of the internal electrode. Then, along with grain growth of the metal particles, since the conductive paste shrinks by sintering in the direction parallel with the plane direction of the internal electrode, a gap is formed between the metal particles along with shrinkage. The phenomena lower the continuity of the internal electrode to deteriorate the electrostatic capacity. Further, since the method of coating a noble metal at high melting point uses an expensive noble metal for coating the metal, the unit price of the metal particles is increased to diminish the merit of using Ni.

It is thus desirable to overcome the foregoing problems and provide a multi-layer ceramic capacitor having an internal electrode of good continuity at a relatively low cost.

SUMMARY OF CERTAIN INVENTIVE ASPECTS

One inventive aspect relates to a multi-layer ceramic capacitor having a substantially hexahedral laminate in which dielectric ceramic layers and internal electrode layers are laminated alternately and the internal electrode layers are formed such that they are exposed to end faces opposed to each other (alternately), and a pair of external electrodes which are formed at the end faces thereof where the internal electrodes of the laminate are exposed and electrically connected with the internal electrode layers, wherein the internal electrode layer is formed of metal particles mainly comprising Ni, and an arithmetic mean particle diameter of the metal particle determined based on the particle diameter in the direction parallel with the plane direction of the internal electrode layer is smaller than the thickness of the internal electrode layer.

Lowering of the continuity of the internal electrode layer is due to the grain growth of the metal particles constituting the internal electrode layer in the direction parallel with the plane direction of the internal electrode layer. In a case where the mean particle size of the metal particle is smaller than the thickness of the internal electrode layer, since there is a margin for the grain growth in the direction of the thickness of the internal electrode layer, grain growth in the direction parallel with the plane direction of the internal electrode layer can be suppressed. According to the means described above, since the grain growth of the metal particles constituting the internal electrode of the multi-layer ceramic capacitor after sintering in the direction parallel with the plane direction of the internal electrode layer is suppressed, an internal electrode of good continuity can be obtained. Further, the arithmetic mean particle diameter is obtained by measuring the particle diameter for a great number of particles (for example, by the number of 100) and defining the mean value for the measured values as the mean particle size.

Further, another inventive aspect relates to a multi-layer ceramic capacitor having a substantially hexahedral laminate in which dielectric ceramic layers and internal electrode layers are laminated (alternately) and the internal electrodes are formed so as to be exposed to the end faces opposed to each other alternately, and a pair of external electrodes which are formed at the end faces where the internal electrodes of the laminate are exposed and electrically connected with the internal electrode layers, wherein the internal electrode layer is formed of a conductive metal layer obtained by heat treating a conductive paste containing Ni metal particles coated with a metal or a metal oxide selected from Mn, Co, Fe, Cu, Nb, Ba, Ca, Sr, Ti, Zn, V, and rare earth metals in a reducing firing atmosphere having an oxygen partial pressure from about $10^{-14}$ to $10^{-18}$ atm.

According to the means described above, since the grain growth of the metal particles constituting the internal electrode of the multi-layer ceramic capacitor after sintering in the direction parallel with the plane direction of the internal electrode layer is suppressed, and the firing shrinkage of the conductive paste in the direction parallel with the plane direction of the internal electrode is suppressed, an internal electrode of good continuity can be obtained. Further, since the internal electrode is formed of metal particles of Ni coated with a base metal, it can be formed relatively inexpensively.

Further, another inventive aspect relates to a method of manufacturing a multi-layer ceramic capacitor having a substantially hexahedral laminate in which dielectric ceramic layers and internal electrode layers are laminated alternately and the internal electrodes are formed so as to be exposed to the end faces opposed to each other alternately, and a pair of external electrodes which are formed at the end faces where the internal electrodes of the laminate are exposed and electrically connected with the internal electrode layers, the method comprising:

preparing a ceramic green sheet that forms a dielectric ceramic layer, preparing a conductive paste having Ni metal particles coated with a metal or a metal oxide selected from Mn, Co, Fe, Cu, Nb, Ba, Ca, Sr, Ti, Zn, V, and rare earth metals, coating the conductive paste on the ceramic green sheet to form an internal electrode pattern that forms the internal electrode layer, laminating the ceramic green sheets each formed with the internal electrode pattern to form a laminate, and firing the laminate in a reducing firing atmosphere having an oxygen partial pressure of from about $10^{-14}$ to $10^{-18}$ atm.

As described above, by firing the conductive paste having the Ni metal particles coated, for example, with Mn, Co, Fe, Cu, Nb, Ba, Ca, Sr, Ti, Zn, V or rare earth metal in a reducing firing atmosphere having an oxygen partial pressure of from about $10^{-14}$ to $10^{-18}$ atm, since the grain growth of the metal particles in the direction parallel with the plane direction of the internal electrode layer is suppressed, and the firing shrinkage of the conductive paste in the direction parallel with the plane direction of the internal electrode layer is suppressed, an internal electrode of good continuity can be obtained.

As shown above, a multi-layer ceramic capacitor having an internal electrode of good continuity can be obtained at a relatively reduced cost.

DETAILED DESCRIPTION OF CERTAIN ILLUSTRATIVE EMBODIMENTS

Figure 1:
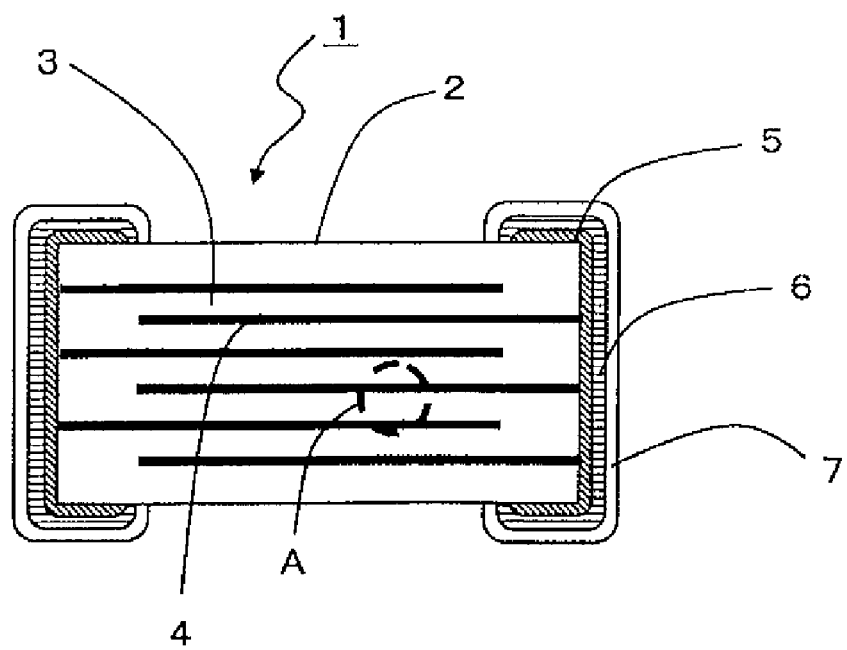
FIG. 1 is a schematic cross sectional view of a multi-layer ceramic capacitor according to one embodiment.
Figure 2:
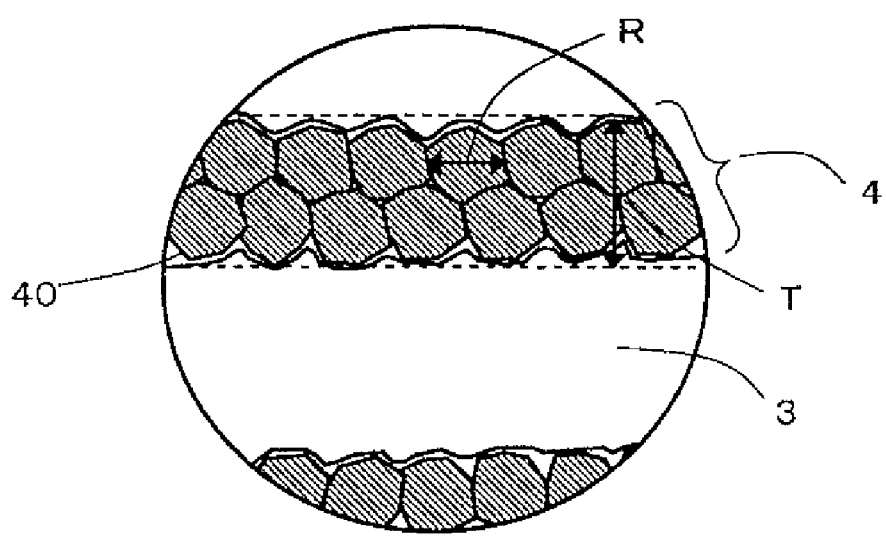
FIG. 2 is an enlarged view for a portion shown by a dotted line A in FIG. 1.

Certain embodiments of a multi-layer ceramic capacitor are to be described with reference to the drawings. FIG. 1 is a schematic cross sectional view showing a multi-layer ceramic capacitor of one embodiment. FIG. 2 is an enlarged view for a portion shown by the dotted line A. A multi-layer ceramic capacitor 1 shown in FIG. 1 has a substantially hexahedral ceramic laminate 2 in which dielectric ceramic layers 3 and internal electrode layers 4 are laminated alternately and the internal electrode layers 4 are formed so as to be exposed at the end faces opposed to each other (alternately), and a pair of external electrodes 5 that are formed to the end faces where the internal electrodes 4 of the ceramic laminate 2 are exposed and electrically connected with the internal electrode layers 4. Further, on the external electrodes 5, a first plating metal layer 6 for protecting the external electrode 5 and a second plating metal layer 7 for improving the solder wetting property are formed optionally.

In the multi-layer ceramic capacitor 1, as shown in FIG. 2, the internal electrode layer 4 comprises metal particles 40. In the metal particle 40, the arithmetic mean particle diameter determined as the particle diameter R in the direction parallel with the plane direction of the internal electrode layer 4 is smaller than the thickness T of the internal electrode layer 4. Since the grain growth of the metal particle 40 is suppressed by the dielectric ceramic layer 3 in the direction of the thickness, growing proceeds so as to extend in the direction parallel with the plane direction of the internal electrode layer 4. Accordingly, since the grain growth of the metal particle 40 can be suppressed and the firing shrinkage can be suppressed by restricting the mean particle size in the direction parallel with the plane direction of the internal electrode layer 4 so as to be smaller than the thickness of the internal electrode layer 4, the internal electrode layer 4 of good continuity can be obtained.

The metal particle 40 as described above can be obtained by forming an internal electrode layer using a conductive paste containing a conductive powder formed by coating the Ni metal particle with a base metal selected from Mn, Co, Fe, Cu, Nb, Ba, Ca, Sr, Ti, Zn, V, and rare earth metals, or an oxide thereof, and applying a heat treatment in a reducing firing atmosphere having an oxygen partial pressure of from about $10^{-14}$ to $10^{-18}$ atm. The rare earth metal includes Y, La, Ce, Pr, Nd, Pm, Sm, Eu, Gd, Tb, Dy, Ho, Er, Tm, Yb, and Lu.

The conductive powder formed by the Ni metal particle coated with the base metal or the oxide thereof can be obtained, for example, by an atomized pyrolysis method or a method of adsorbing an acetyl acetonate metal complex. The atomized pyrolysis method is a method of atomizing a solution containing a salt of a base metal to be precipitated into a liquid droplet, heating the salt to a temperature higher than the pyrolysis temperature of the salt or to a temperature near or higher than the melting point of the base metal to be precipitated, pyrolyzing the salt and precipitating the base metal or the base metal oxide to the surface of the Ni metal particle. Further, the method of adsorbing the acetyl acetonate metal complex is a method of dispersing the Ni metal particle into an organic solvent such as alcohol, acetone, ester, or aldehyde, dropping a complex of acetyl acetonate and a base metal while heating to about 50° C. to 90° C., stirring them for about 10 min to 10 hr, and applying a heat treatment to the obtained product at about 350° C. to 450° C. for about 10 min to 2 hr. By the methods described above, a firm coated layer of the base metal or the base metal oxide is formed on the surface of the Ni metal particle.

Then, a method of manufacturing a multi-layer ceramic capacitor in FIG. 1 is to be described. At first, a dielectric ceramic powder that forms a dielectric ceramic layer 3 after sintering is mixed with an organic binder and a solvent to form a ceramic slurry. For the dielectric ceramic powder, those comprising barium titanate as the main phase, mixed with an additive such as a rare earth metal oxide or a transition metal oxide and applied with a heat treatment are used. As the organic binder, polyvinyl butyral or the like is used. Further, as the solvent, ethanol or the like is used. The ceramic slurry is formed into a sheet shape of about 3 to 10 μm thickness by a doctor blade method to obtain a ceramic green sheet.

Then, an Ni powder obtained, for example, by the atomized pyrolysis method or the method of adsorbing the acetyl acetonate metal complex is mixed with the organic binder and the solvent to obtain a conductive paste for the internal electrode. As the organic binder used for the conductive paste, ethyl cellulose or the like is used. As the solvent, terpineol or the like is used and those having less compatibility with the organic binder constituting the ceramic green sheet are preferred.

Then, a prepared conductive paste is coated on the prepared ceramic green sheet by screen printing to form an internal electrode pattern that forms an internal electrode layer 4 after firing. The internal electrode pattern is formed by arranging a plurality of substantially rectangular paste films at a predetermined distance (size of margin×2+size for cutting width) in a lattice shape.

Then, the ceramic green sheet formed with the internal electrode pattern is punched into a predetermined shape, laminated by a predetermined number of sheets and then hot pressed to obtain an assembly of a laminate. In a case of laminating the ceramic green sheets, they are laminated so as to be displaced by half pattern on every layer in the longitudinal direction of the internal electrode pattern. As described above, it is fabricated such that a substantially hexahedral ceramic laminate 2 in which the internal electrode layers 4 are exposed alternately to the opposing end faces is obtained after divisional cutting and sintering. The method of displacing the sheets each by half pattern includes a method of punching the ceramic green sheets while displacing them each by half pattern upon punching the sheet, a method of forming the internal electrode pattern by using a printing screen previously displaced by half pattern.

Then, the assembly of the laminate is divisionally cut, for example, by a press cutter, a dicing saw or the like to obtain a laminate that forms the ceramic laminate 2 after sintering. Then, after applying a debinding treatment to the laminate by heating in a nitrogen atmosphere, it is fired in a reducing firing atmosphere having an oxygen partial pressure of from about $10^{-14}$ to $10^{-18}$ atm at a temperature of from about 1100° C. to 1300° C. Thus, the ceramic laminate 2 is obtained. In the existent reducing atmosphere baking, it was conducted at an oxygen partial pressure of about $10^{-6}$ to $10^{-14}$ atm. In one embodiment, firing is conducted in an oxygen partial pressure region lower than usual.

Then, a conductive paste is coated and fired at the end face where the internal electrode 4 of the ceramic laminate 2 is exposed to form the external electrode 5. The metal constituting the external electrode includes, for example, Ag, Cu or Ni. The external electrode 5 may also be formed by coating the conductive paste before firing the ceramic laminate 2 and firing at the same time with the dielectric ceramic layer 3. Then, a first plating layer 6 is formed on the external electrode 5 by electrolytic Ni plating or electrolytic Cu plating, on which a second plating layer 7 is formed by electrolytic Sn plating. In this way, the multi-layer ceramic capacitor 1 is obtained.

In the thus obtained multi-layer ceramic capacitor 1, grain growth of the metal particle 40 constituting the internal electrode layer 4 is suppressed. Since the grain growth of the metal particle 40 is suppressed, firing shrinkage of the conductive paste is suppressed. This suppresses the phenomenon that the ceramic powder present between the metal particles in the state of the conductive paste is extruded by the metal particles during firing. Further, generation of a gap between metal particles due to firing shrinkage of the conductive paste is suppressed. By the effects as described above, the multi-layer ceramic capacitor 1 having the internal electrode layer 4 of good continuity can be obtained.

EXAMPLES

Example 1

A barium titanate type dielectric ceramic powder as the material for a capacitor showing X7R characteristics (change of rate of the electrostatic capacity; ±15%, in a temperature ranging from −55° C. to +125° C., with 25° C. as a reference) is prepared, which is mixed with polyvinyl butyral, dioctyl phthalate, ethanol, etc. and mixed by a disper mill for 15 hr to obtain a ceramic slurry. The obtained ceramic slurry is coated on an elongate PET film by a doctor blade method to form a ceramic green sheet of 1.4 μm thickness.

An Ni powder formed by coating CoO to an Ni particle with an arithmetic mean grain size of 0.2 μm by an atomized pyrolysis method is mixed with ethyl cellulose, terpineol, etc. to prepare a conductive paste for internal electrode. The conductive paste is coated on the ceramic green sheet by a screen printing method to form an internal electrode pattern where paste films each of a substantially rectangular shape of 3.75 mm×0.75 mm at a thickness of 1 μm are arranged in plurality each at 0.25 mm distance within a range of 15 cm×15 cm. In this case, the coating amount of the conductive paste is controlled to 4.0 μg/mm² by an X-ray measuring device.

Then, the ceramic green sheet formed with the internal electrode pattern is punched into a shape of 15 cm×15 cm, and the punched ceramic green sheets are laminated by the number of 350 sheets while displacing alternately by half pattern on every layer, and ceramic green sheets of 100 μm thickness are stacked as the protection layer above and below the laminate and then heating crimped to obtain an assembly of the laminate.

Then, the obtained assembly of the laminate is divisionally cut by a press cutter to a size of 2.0 mm×1.0 mm to obtain a laminate. The laminate is applied with a debinding treatment in a nitrogen atmosphere at 280° C. Then, an Ni conductive paste is coated on the internal layer electrode exposed surface of the laminate by dip coating to form an external electrode. Then, an uncalcined chip is fired in a reducing atmosphere with an oxygen partial pressure of $10^{-14}$ to $10^{-18}$ atm at a temperature of 1200° C. for 1 hr and then applied with a heat treatment in a nitrogen atmosphere at 800° C. to obtain a multi-layer ceramic capacitor having a rated electrostatic capacity of 10 μF for 1.6 mm×0.8 mm.

For the multi-layer ceramic capacitors as described above, those formed by changing the amount of CoO coated on the Ni particles and those formed by changing the oxygen partial pressure of the firing atmosphere are prepared as shown in Table 1. In the sample 5, the internal electrode is formed by using a conductive paste formed by mixing an Ni powder not coated with CoO and a powder of CoO. Further, the coating amount or addition amount of CoO is expressed by atomic % assuming Ni as 100.

TABLE 1

| | Internal electrode paste | | | |
|---|---|---|---|---|
| | Ni particle diameter D50 (μm) | Coating element | Coating amount (atomic %) | Firing condition Oxygen partial pressure (atm) |
| Sample 1 | 0.2 | none | 0 | 8.8E−12 |
| Sample 2 | 02 | Co | 1.0 | 8.8E−12 |
| Sample 3 | 0.2 | none | 0 | 2.4E−15 |
| Sample 4 | 0.2 | Co | 1.0 | 9.5E−15 |
| Sample 5 | 0.2 | Co | 1.0 | 9.5E−15 |
| Sample 6 | 0.2 | Co | 0.5 | 2.4E−15 |
| Sample 7 | 0.2 | Co | 0.05 | 2.4E−15 |
| Sample 8 | 0.2 | Co | 0.04 | 2.4E−15 |
| Sample 9 | 0.2 | Co | 20 | 2.4E−15 |
| Sample 10 | 0.2 | Co | 21 | 2.4E−15 |
| Sample 11 | 0.2 | Co | 1.0 | 5.5E−16 |
| Sample 12 | 0.2 | Co | 1.0 | 8.5E−17 |
| Sample 13 | 0.2 | Co | 1.0 | 4.7E−18 |
| Sample 14 | 0.2 | Co | 10 | 5.2E−16 |

Figure 3:
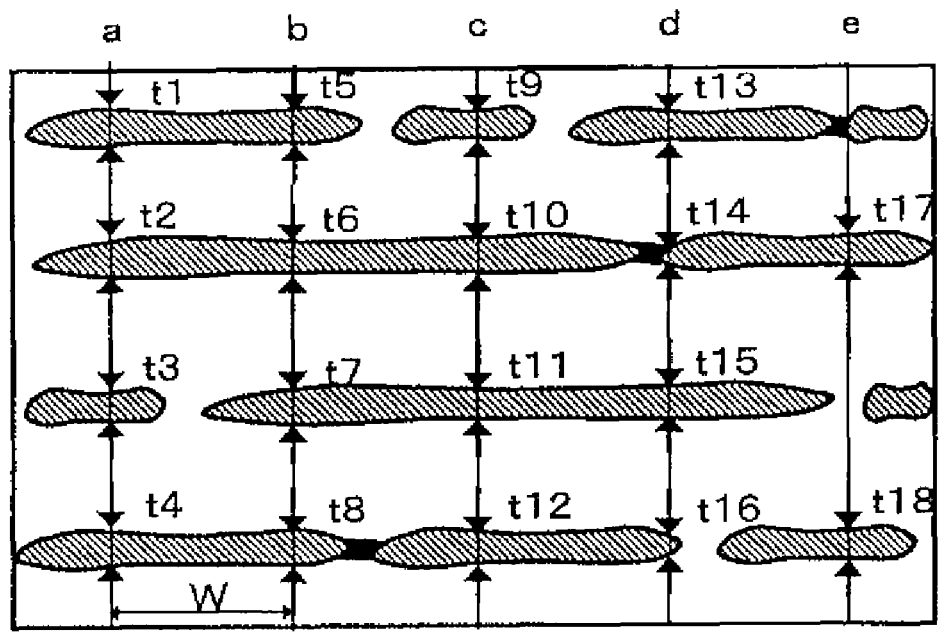
FIG. 3 is a view showing a method of measuring the thickness of an internal electrode layer.
Figure 4:
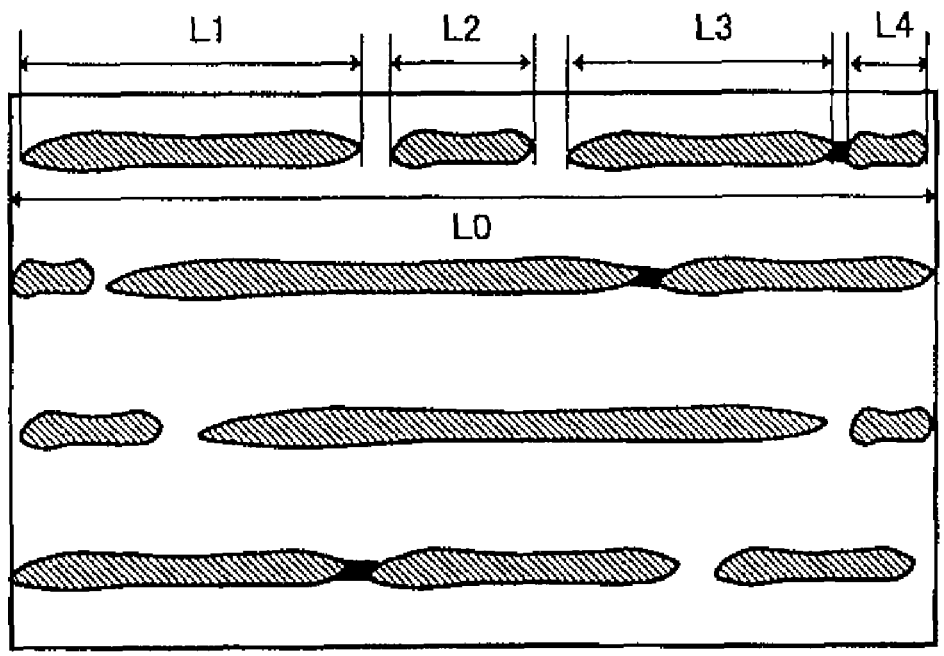
FIG. 4 is a view showing a method of measuring the continuity of the internal electrode layer.
Figure 5:
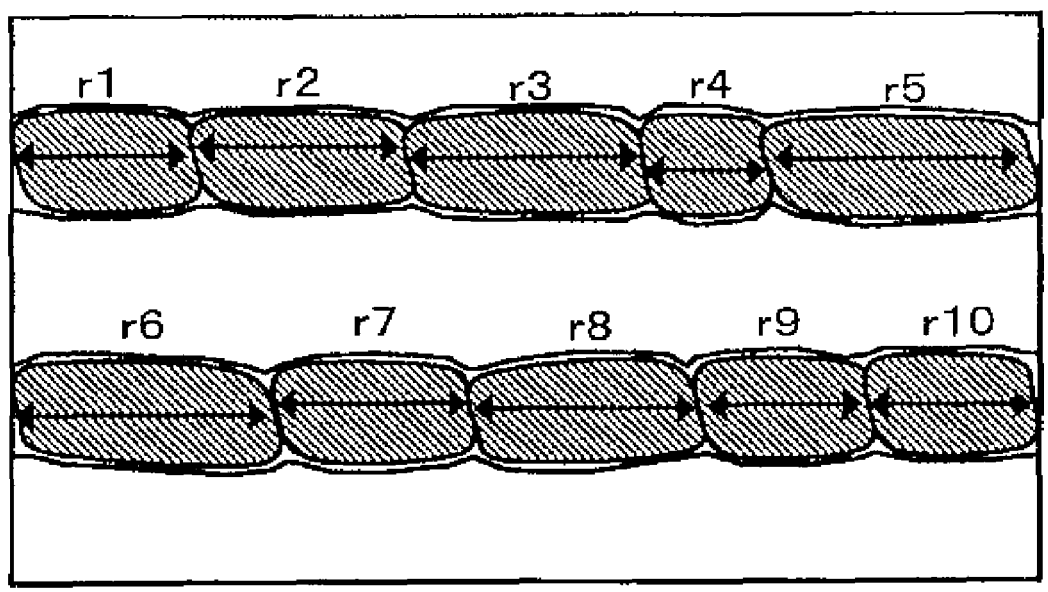
FIG. 5 is a view showing a method of measuring a mean grain size of a metal particle constituting the internal electrode layer.

Then, for the obtained multi-layer ceramic capacitors, the electrostatic capacity, the thickness of the internal electrode layer, the continuity of the internal electrode layer, and the mean particle size of the metal particles constituting the internal electrode are measured and they are shown in Table 2. For the electrostatic capacity, multi-layer ceramic capacitors are heated at 150° C. for 1 hr and cooled by leaving at a room temperature for 3 hr, and samples are measured each by the number of 10 under a circumstance at 25° C. using a measuring instrument such as 4278A manufactured by Hewlett Packard Co. and the electrostatic capacity is defined as a mean value thereof. For the thickness of the internal electrode layer, the multi-layer ceramic capacitor is polished from the lateral side to expose the internal electrode, which is observed under magnification of 5000 to 10000× by a microscope or the like, perpendiculars a, b, c, d, and e are drawn each at a predetermined distance W (for example 2 μm on a scale) as shown in FIG. 3, and each length for t1 to t18 of the perpendicular extended along the internal electrode layer are measured, each for three points and the thickness is determined as a mean value thereof. Since the intersections between the perpendicular e and the uppermost internal electrode layer and between the perpendicular e and the third internal electrode layer from above are not present on the metal portion, they are not considered as the measuring points. For the continuity, the multi-layer ceramic capacitors are polished from the lateral side to expose the internal electrode, which are observed under magnification of 5000 to 10,000× by a microscope or the like. As shown in FIG. 4, length L0 at the observed portion is measured by using a scale of a microscope or the like, then lengths L1 to L4 for the metal portion within a range of L0 of one internal electrode layer are measured and totalized to calculate ΣLn/L0 and determine the continuity for one layer. Measurement is conducted for 30 layers and the continuity is determined as the mean value thereof. Further, for the mean particle size of the metal particles, multi-layer ceramic capacitors which are polished at the lateral side to expose the internal electrode are fired again for hot etching at a temperature lower by about 100° C. than the firing temperature (for example, 1100° C.) for one hour under the same oxygen partial pressure as in the firing. Then, as shown in FIG. 5, the particle diameters r1, r2, r3, are measured for 300 particles in the direction parallel with the plane direction of the internal electrode to calculate the mean value thereof and this is defined as the mean particle size.

TABLE 2

| | Internal electrode | | | |
|---|---|---|---|---|
| | Mean particle size D50 (μm) | Thickness (μm) | Continuity (%) | Electrostatic capacity (μF) |
| Sample 1 | 1.2 | 1.1 | 75 | 8.2 |
| Sample 2 | 1.1 | 0.97 | 76 | 8.4 |
| Sample 3 | 1.1 | 0.92 | 79 | 8.6 |
| Sample 4 | 0.61 | 0.72 | 88 | 9.9 |
| Sample 5 | 1.1 | 1.0 | 78 | 8.9 |
| Sample 6 | 0.66 | 0.78 | 84 | 9.6 |
| Sample 7 | 0.85 | 0.88 | 82 | 9.1 |
| Sample 8 | 1.1 | 0.98 | 79 | 8.4 |
| Sample 9 | 0.41 | 0.62 | 80 | 9.1 |
| Sample 10 | 0.81 | 0.65 | 68 | 7.5 |
| Sample 11 | 0.53 | 0.7 | 92 | 10.1 |
| Sample 12 | 0.68 | 0.74 | 81 | 9.1 |
| Sample 13 | 0.84 | 0.75 | 80 | X |
| Sample 14 | 0.27 | 0.48 | 94 | 10.8 |

In this case, for the electrostatic capacity, those within a range of ±10% relative to the rated electrostatic capacity value, that is, from 9.0° F. to 11.0 μF are evaluated as satisfactory. Further, for the continuity, those having 80% or more are evaluated as satisfactory.

Sample 1 corresponds to the existent multi-layer ceramic capacitor. According to the result of Table 2, the mean particle size of the metal particle is larger than the thickness of the internal electrode layer, the continuity is as low as less than 80%, and also the electrostatic capacity is less than 9.0 μF. For the Sample 2, the conductive paste used for the internal electrode is that for one embodiment and the oxygen partial pressure in the firing environment is within the existent range. However, the continuity is as low as less than 80% and also the electrostatic capacity is less than 9.0 μF. Sample 3 is obtained by firing the existent multi-layer ceramic capacitor under an oxygen partial pressure in the firing environment of one embodiment. However, the continuity is as low as less than 80% and the electrostatic capacity is also less than 9.0 μF. Also for the Sample 5, the effect of one embodiment cannot be obtained. On the other hand, for the Sample 4 formed with the conductive paste of one embodiment and in the firing environment within a range at an oxygen partial pressure of one embodiment, the mean particle size of the metal particle is smaller than the thickness of the internal electrode layer, the continuity is 80% or more and the electrostatic capacity is also 9.0 μF or more.

In Sample 6 to Sample 10, the amount of CoO coated on the Ni particle is changed. According to Table 2, those within a range of 0.05 to 20 atomic % have mean particle size of the metal particle smaller than the thickness of the internal electrode layer, continuity of 80% or more and also electrostatic capacity of 9.0 μF or more.

In Sample 11 to Sample 14, the oxygen partial pressure in the firing atmosphere is changed. According to Table 2 and also in view of the result of Sample 2, those with the oxygen partial pressure in a range from $10^{-14}$ to $10^{-18}$ atm have mean particle size of the metal particle smaller than the thickness of the internal electrode layer, continuity of 80% or more and also electrostatic capacity of 9.0 μF or more. In a case where the oxygen partial pressure is lower than $10^{-18}$ atom, the dielectric ceramic layer is reduced and it no more functions as the capacitor as seen in Sample 13.

Example 2

Multi-layer ceramic capacitors are formed in the same manner as in Example 1 except for using an Ni powder coated with a base metal by a method of adsorbing an acetylacetonate metal complex to an Ni particle having an arithmetic mean particle size of 0.2 μm. The type of the coating base metal is shown in Table 3.

TABLE 3

| | Internal electrode paste | | | |
|---|---|---|---|---|
| | Ni particle diameter | Coating element | Coating amount (atomic %) | Firing condition Oxygen partial pressure (atm) |
| Sample 15 | 0.2 | Mn | 1.0 | 9.5E−16 |
| Sample 16 | 0.2 | Ti | 0.5 | 9.5E−16 |
| Sample 17 | 0.2 | Ca | 1.0 | 9.5E−16 |
| Sample 18 | 0.2 | Ba | 1.0 | 9.5E−16 |
| Sample 19 | 0.2 | Sr | 1.0 | 9.5E−16 |
| Sample 20 | 0.2 | Fe | 1.0 | 9.5E−16 |
| Sample 21 | 0.2 | Zn | 1.5 | 9.5E−16 |
| Sample 22 | 0.2 | Cu | 1.0 | 9.5E−16 |
| Sample 23 | 0.2 | Nb | 1.5 | 9.5E−16 |
| Sample 24 | 0.2 | V | 0.3 | 9.5E−16 |

TABLE 3-continued

| | Internal electrode paste | | | |
|---|---|---|---|---|
| | Ni particle diameter | Coating element | Coating amount (atomic %) | Firing condition Oxygen partial pressure (atm) |
| Sample 25 | 0.2 | Y | 0.5 | 9.5E−16 |
| Sample 26 | 0.2 | Ho | 0.5 | 9.5E−16 |
| Sample 27 | 0.2 | Dy | 0.5 | 9.5E−16 |
| Sample 28 | 0.2 | Mn—Co | 0.5-0.5 | 9.5E−16 |
| Sample 29 | 0.2 | Co—Fe | 0.5-0.5 | 9.5E−16 |

For the obtained multi-layer ceramic capacitors, electrostatic capacity, thickness of the internal electrode layer, continuity of the internal electrode layer, and mean particle size of the metal particle constituting the internal electrode are measured in the same manner as in Example 1 and shown in Table 4.

TABLE 4

| | Internal electrode | | | |
|---|---|---|---|---|
| | Mean particle size D50 (μm) | Thickness (μm) | Continuity (%) | Electrostatic capacity (μF) |
| Sample 15 | 0.58 | 0.68 | 89 | 9.5 |
| Sample 16 | 0.52 | 0.77 | 82 | 9.2 |
| Sample 17 | 0.62 | 0.72 | 81 | 9.3 |
| Sample 18 | 0.65 | 0.76 | 84 | 9.1 |
| Sample 19 | 0.63 | 0.74 | 82 | 9.3 |
| Sample 20 | 0.61 | 0.71 | 81 | 9.2 |
| Sample 21 | 0.52 | 0.74 | 92 | 10.0 |
| Sample 22 | 0.58 | 0.73 | 89 | 10.1 |
| Sample 23 | 0.65 | 0.73 | 89 | 10.3 |
| Sample 24 | 0.38 | 0.51 | 97 | 10.8 |
| Sample 25 | 0.49 | 0.58 | 91 | 9.7 |
| Sample 26 | 0.43 | 0.59 | 92 | 10.2 |
| Sample 27 | 0.44 | 0.58 | 91 | 9.9 |
| Sample 28 | 0.52 | 0.70 | 91 | 10.2 |
| Sample 29 | 0.43 | 0.59 | 89 | 9.8 |

From the result of Table 4, it is found that the same effect can be obtained also by using Mn, Fe, Cu, Nb, Ba, Ca, Sr, Ti, Zn, V, and rare earth metals in addition to Co as the base metal for coating Ni.

With the result described above, it is found that multi-layer ceramic capacitors with good continuity can be obtained according to certain embodiments. The foregoing embodiments provide an effective means, particularly, in a case where the amount of the metal particles is small and firing shrinkage tends to be promoted as in the multi-layer ceramic capacitor with the thickness of the internal electrode layer of 1 μm or less, and a multi-layer ceramic capacitor having an internal electrode layer with a thickness of 1 μm or less and having good continuity can be obtained as shown in the examples described above.

Further details on the invention may be found in Japanese patent application no. 194041/2007, which is incorporated herein in its entirety.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention.

What is claimed is:

1. A multi-layer ceramic capacitor having a substantially hexahedral laminate in which dielectric ceramic layers and internal electrode layers are laminated alternately and the internal electrode layers are formed so as to be exposed to end faces opposed to each other alternately, and a pair of external electrodes which are formed at the end faces where the internal electrodes of the laminate are exposed and electrically connected with the internal electrode layers, wherein the internal electrode layer is formed of metal particles comprising Ni, and an arithmetic mean particle diameter of the metal particles is smaller than the thickness of the internal electrode layer, the arithmetic mean particle diameter being determined based on the particle diameter in the direction parallel with the plane direction of the internal electrode layer, wherein the internal electrode layer comprises a conductive metal layer obtained by heat treating a conductive paste in a reducing firing atmosphere having an oxygen partial pressure from about $10^{-14}$ to $10^{-18}$ atm, the conductive paste comprising Ni metal particles coated with a metal or a metal oxide comprising one or more of Mn, Co, Fe, Cu, Nb, Ba, Ca, Sr, Ti, Zn, V, and a rare earth metal.

2. The multi-layer ceramic capacitor of claim 1, wherein the rare earth metal is selected from one or more of Y, La, Ce, Pr, Nd, Pm, Sm, Eu, Gd, Tb, Dy, Ho, Er, Tm, Yb, and Lu.

3. The multi-layer ceramic capacitor of claim 1, wherein the Ni metal particles are coated with the metal or metal oxide in an amount of 0.05 to 20 atomic % per 100 atomic % of Ni.

4. The multi-layer ceramic capacitor of claim 1, wherein the Ni metal particles are coated with the metal or metal oxide by atomized pyrolysis method.

5. The multi-layer ceramic capacitor of claim 1, wherein the internal electrode layer has a thickness of 1 μm or less.

6. A method of manufacturing a multi-layer ceramic capacitor having a substantially hexahedral laminate in which dielectric ceramic layers and internal electrode layers are laminated alternately and the internal electrode layers are formed so as to be exposed to end faces opposed to each other alternately, and a pair of external electrodes which are formed at the end faces where the internal electrodes of the laminate are exposed and electrically connected with the internal electrode layers, the method comprising:

preparing a ceramic green sheet that forms a dielectric ceramic layer, preparing a conductive paste comprising Ni metal particles coated with a metal or a metal oxide comprising one or more of Mn, Co, Fe, Cu, Nb, Ba, Ca, Sr, Ti, Zn, V, and a rare earth metal, the metal or metal oxide being included in the metal particles in an amount of 0.05 to 20 atomic % per 100 atomic % of Ni, coating the conductive paste on the ceramic green sheet to form an internal electrode pattern that forms the internal electrode layer, laminating the ceramic green sheet formed with the internal electrode pattern to form a laminate, and firing the laminate in a reducing firing atmosphere having an oxygen partial pressure of from about $10^{-14}$ to $10^{-18}$ atm.

7. The method of claim 6, wherein the preparing of a conductive paste comprises an atomized pyrolysis method.

8. The method of claim 6, wherein the preparing of a conductive paste comprises adsorbing an acetyl acetonate metal complex.

9. A multi-layer ceramic capacitor manufactured by a process comprising the method of claim 6.

10. The method of claim 6, wherein the Ni metal particles are coated with the metal or metal oxide by atomized pyrolysis method.

* * * * *